US005240627A

United States Patent [19]

Mohri et al.

[11] Patent Number: 5,240,627

[45] Date of Patent: Aug. 31, 1993

[54] BONDED RARE EARTH MAGNET AND A PROCESS FOR MANUFACTURING THE SAME

[75] Inventors: Fumihito Mohri; Takuji Nomura; Shougo Miki, all of Otsu, Japan

[73] Assignee: Kanegafuchi Kagaku Kogyo Kabushiki Kaisha, Osaka, Japan

[21] Appl. No.: 748,769

[22] Filed: Aug. 22, 1991

Related U.S. Application Data

[63] Continuation-in-part of Ser. No. 733,749, Jul. 24, 1991, abandoned.

[30] Foreign Application Priority Data

| | | | |
|---|---|---|---|
| Jul. 24, 1990 | [JP] | Japan | 2-195958 |
| Aug. 11, 1990 | [JP] | Japan | 2-213110 |
| Nov. 14, 1990 | [JP] | Japan | 2-309199 |

[51] Int. Cl.$^5$ .......... C04B 35/04

[52] U.S. Cl. .......... 252/62.54; 148/302

[58] Field of Search .......... 252/62.54; 148/302

[56] References Cited

U.S. PATENT DOCUMENTS

| | | | |
|---|---|---|---|
| 4,689,163 | 8/1987 | Yamashita et al. | 252/62.54 |
| 4,810,572 | 3/1989 | Ooe et al. | 252/62.54 |
| 4,881,986 | 11/1989 | Sato et al. | 148/103 |
| 4,898,625 | 2/1990 | Otsuka et al. | 148/101 |
| 4,902,360 | 2/1990 | Ma et al. | 148/302 |
| 4,913,745 | 4/1990 | Sato | 148/103 |
| 4,981,635 | 1/1991 | Yamashita et al. | 264/112 |
| 4,988,755 | 1/1991 | Dickens al. | 252/62.54 |
| 5,011,552 | 4/1991 | Otsuka et al. | 148/302 |
| 5,149,477 | 9/1992 | Yamashita et al. | 264/112 |

FOREIGN PATENT DOCUMENTS

| | | |
|---|---|---|
| 0320064 | 12/1988 | European Pat. Off. . |
| 0197712 | 1/1990 | European Pat. Off. . |

*Primary Examiner*—John P. Sheehan
*Attorney, Agent, or Firm*—Armstrong, Westerman, Hattori, McLeland & Naughton

[57] ABSTRACT

A highly rustproof resin-bonded magnet made by using a specific rustproofing resin for coating the particles of a magnetic powder, bonding them to form a molded body, or coating its surface, or for two or all of those purposes. The specific resin is selected from ones containing groups of atoms having a power of forming a coordinate bond and a reducing action. More specifically, it is (a) a high molecular compound produced by reacting with an epoxy resin one or more of a polyhydric phenol having adjacent hydroxyls, a polyhydric phenolic carboxylic acid having adjacent hydroxyls, an ester of a polyhydric phenol and a polyhydric alcohol having adjacent hydroxyls, and a polycyclic and polyhydric phenol having adjacent hydroxyls, (b) a redox resin as a reduction agent or (c) a high molecular compound produced by curing a mixture of ascorbic acid, or a derivative thereof, and an epoxy resin.

11 Claims, No Drawings

BONDED RARE EARTH MAGNET AND A PROCESS FOR MANUFACTURING THE SAME

This application is a continuation-in-part of Ser. No. 07/733,749 filed Jul. 24, 1991, abandoned.

BACKGROUND OF THE INVENTION

1. Field of the Invention

This invention relates to a resin-bonded magnet consisting mainly of iron and having an improved level of rustproofness, and a process for making the same. More particularly, it is concerned with a resin-bonded rare earth-iron-boron (hereinafter referred to as Nd-Fe-B) magnet and a process for making the same.

2. Description of the Prior Art

It has long been known that there are alloys or compounds consisting mainly of iron (i.e., containing at least 50 atom % of iron), and having very high magnetic properties, since iron is an element having a higher saturation magnetic flux density at room temperature than any other element does, and that those alloys or compounds can be used for making resin-bonded magnets having very high magnetic properties. Specific examples of those alloys or compounds are $Nd_2Fe_{14}B$, $SmFe_{12}$ and $Fe_{16}N_2$ which have all been recently developed. All of these alloys or compounds have, however, the drawback of being easily oxidized and getting rusty, as they contain a high proportion of iron. This is particularly the case with Nd-Fe-B magnets for which there has recently been an increasing demand. They easily get rusted in a highly humid environment. Various measures have, therefore, been proposed for making those magnets rustproof, and include the coating of the surface of a resin-bonded Nd-Fe-B magnet with an acrylic or epoxy resin (Japanese Patent Applications Laid-Open Nos. 244710/1988 and 244711/1988), and the coating thereof with a fluorine-containing resin (Japanese Patent Application Laid-Open No. 168221/1986). They also include electrodeposition on the magnet surface, and the plating of the magnet surface with nickel, or other metal.

All of these methods are, however, unsatisfactory from the standpoint of economy or corrosion resistance, or both. The coating of the magnet surface with a resin can be done at a low cost, but is incomplete as a rustproofing method, since it is difficult for any resin to shut off oxygen and water completely. Electrodeposition is costly. Metal plating is also costly, and moreover involves every likelihood that even a small amount of coating solution remaining on the magnet surface may cause corrosion to propagate over an enlarged area.

The use of a reducing resin has also been proposed. For example, Japanese Patent Application Laid-Open No. 290209/1989 discloses a rare earth alloy magnet coated with a film containing an alkylphenol, or alkylpolyhydric phenol resin. The resin is, however, used only for coating the surface of a sintered magnet, and cannot always be said to be effective as a bonding resin for a bonded magnet.

We, the inventors of this invention, found that a special resin which was obtained by polycondensation reaction from tannic acid, phenol and formaldehyde (hereinafter referred to as a "polytannin resin") was very effective for rustproofing a bonded Nd-Fe-B magnet. As a result of further research, however, we have found that bonded magnets made by using this resin as a binder are not always satisfactory in strength, apparently because it is a resin intended primarily for coating a surface. This is particularly the case with a cylindrical magnet having a small wall thickness and a large bore diameter. It cracks or chips during handling, and hardly can withstand any practical use. Thus, we have reached the conclusion that this resin is not suitable as a binder, despite its excellent rustproofing power.

The known methods for improving the corrosion resistance of a bonded magnet include not only the use of a rustproofing synthetic resin as a binder, but also the coating of a magnetic powder, or the surface of a magnet with a rustproofing synthetic resin. A combination of these methods may be employed for achieving a still higher level of rustproofness. However, insofar as none of the resins as hereinabove mentioned is suitable as a binder, but all of them are used only for coating a magnet to render it rustproof, it has been necessary to employ another resin as a binder. This has been an obstacle to the realization of a simplified manufacturing process.

SUMMARY OF THE INVENTION

Under these circumstances, it is an object of this invention to develop a resin which is very effective for rustproofing purposes and can also be used as a binder to make a satisfactorily strong bonded magnet, or a resin which is useful not only as a binder, but also for coating the powder of a magnet material, or the surface of a magnet, and thereby to provide a bonded magnet which is easy to manufacture and yet is excellent in corrosion resistance and is sufficiently strong for practical use.

It is another object of this invention to provide a simple process for manufacturing a rustproof and strong bonded magnet.

A rustproofing resin is used as a binder for making a magnet intended for use in an environment which is not very corrosive. The magnet is not given any rustproofing surface treatment, but can be manufactured at a correspondingly lower cost. On the other hand, a magnet which is intended for use in a corrosive environment is made from a powder coated with a rustproofing resin, and bonded with a rustproofing resin, and is coated with a rustproofing resin to acquire a still higher level of corrosion resistance.

It has occurred to us that a resin containing a group of atoms having a power of forming a coordination bond (or chelate) and a reducing action, as a polytannin resin does, can probably be used for the purpose of this invention. As a result of further research, we have found that the high molecular compounds as identified at (a) to (c) below are, among others, useful for the purpose of this invention:

(a) A high molecular compound produced by reacting with an epoxy resin one or more of a polyhydric phenol containing adjacent hydroxyls, a polyhydric phenolic carboxylic acid containing adjacent hydroxyls, an ester of a polyhydric phenol and a polyhydric alcohol containing adjacent hydroxyls, and a polycyclic and polyhydric phenol containing adjacent hydroxyls (hereinafter referred to as an "epoxy resin modified with a polyhydric phenol");

(b) A redox resin as a reduction agent; and (c) A high molecular compound produced by curing a mixture of ascorbic acid, or a derivative thereof, and an epoxy resin.

According to a first aspect of this invention, there is provided a magnet composed mainly of a powder of a magnetic material containing at least 50% of iron, and an epoxy resin modified with polyhydric phenol or composed mainly of such a powder, such an epoxy resin, and another ordinary resin.

According to a second aspect of this invention, there is provided a process for manufacturing a magnet which comprises coating a powder of a magnetic material containing at least 50% of iron with an epoxy resin modified with polyhydric phenol or coating it with a mixture of an epoxy resin modified with polyhydric phenol and another ordinary resin, or coating it with an epoxy resin modified with polyhydric phenol and thereafter with another ordinary resin to thereby form a double resin coating on the magnetic powder surface, and bonding the powder with a synthetic resin as a binder.

According to a third aspect of this invention, there is providing a process for manufacturing a magnet which comprises bonding powder of a magnetic material containing at least 50% of iron with a binder selected from an epoxy resin modified with polyhydric phenol, and a mixture thereof with another ordinary resin.

According to a fourth aspect of this invention, there is provided a process for manufacturing a magnet which comprises bonding a powder of a magnetic material containing at least 50% of iron with an ordinary resin as a binder to form a body, and coating the surface of the body with an epoxy resin modified with polyhydric phenol, or coating it with a mixture thereof with another synthetic resin, or coating it with an epoxy resin modified with polyhydric phenol, and thereafter with another ordinary resin to thereby form a double resin coating on the body surface.

According to a fifth aspect of this invention, there is provided a bonded rare earth magnet comprising a body made by bonding a powder of a magnetic material containing at least 50% of iron with a reducing redox resin used as a binder.

According to a sixth aspect of this invention, there is provided a bonded rare earth magnet comprising a body made by bonding a powder of a magnetic material containing at least 50% of iron with a binder resin obtained by curing a mixture of ascorbic acid, or a derivative thereof, and an epoxy resin.

The coating of a magnetic powder with an epoxy resin modified with a polyhydric phenol, or with such an epoxy resin and another resin enables the manufacture of a magnet which is wholly resistant to oxidation and corrosion. The use, as a binder, of such an epoxy resin, or both such an epoxy resin and another ordinary resin makes it possible to manufacture a magnet having oxidation and corrosion resistance at a low cost without calling for any additional step over any relevant process known in the art. The use of such a binder is also effective for making up any defect that may exist in a film formed on the surface of a bonded or molded body to impart oxidation and corrosion resistance to it, if any.

The formation of a layer of such an epoxy resin, or of such an epoxy resin and another resin on the surface of a molded body is an economical way of imparting high oxidation and corrosion resistance to it. The formation of such a layer is also effective for making up any defect that may develop in a film covering the particles of the magnetic powder, if any.

Still higher oxidation and corrosion resistance can be achieved by combining in different ways the coating of the magnetic powder with such an epoxy resin, or with such an epoxy resin and another resin, the use of such an epoxy resin, or such an epoxy resin and another resin, as the binder, and the coating of the molded body with such an epoxy resin, or with such an epoxy resin and another resin.

The same compound can be used for coating the magnetic powder, as the binder, and for coating the molded body. This enables a greatly simplified manufacturing process.

Spraying or dipping can, for example, be used for coating the surface of the molded body with a modified epoxy resin, or a mixture thereof with another resin, or for coating a film of a modified epoxy resin with another resin.

Spraying, dipping or kneading can, for example, be used for coating the particles of the magnetic powder with an epoxy resin modified with polyhydric phenol, or a mixture thereof with another resin, or for coating a film of an epoxy resin modified with polyhydric phenol on the particles with another resin.

There are two modes when both a modified epoxy resin and another resin are employed:

(I) A mixture of the two resins is used as the binder, or for coating the magnetic powder, or the molded body; and (II)The epoxy resin modified with polyhydric phenol is first used for coating the magnetic powder, or the molded body, and is overcoated with the other resin, whereby a double-layer coating is formed.

When the mode (I) is employed, it is preferable to use the epoxy resin modified with polyhydric phenol in a proportion which is equal to at least 10% by volume of the other resin. If its proportion is less than 10% by volume, it is difficult to achieve a satisfactorily high level of oxidation and corrosion resistance. When the mode (II) is employed, it is preferable to form a film of the epoxy resin modified with polyhydric phenol having a thickness of 0.1 to 100 microns. If its thickness is smaller than 0.1 micron, it is impossible to achieve any satisfactory oxidation and corrosion resistance, and if it exceeds 100 microns, the surface of the magnet proper is spaced apart from the outer surface of the film by so large a distance that a reduction in effective magnetic force results in the failure to achieve any satisfactory magnetic properties.

The amount, or total amount of the epoxy resin modified with polyhydric phenol, or the modified epoxy resin and the other resin used for coating the particles of the magnetic powder, or as the binder, is preferably equal to at least 5% by volume of the magnetic powder. If it is less than 5% by volume, it is difficult to obtain any satisfactory oxidation and corrosion resistance, or any practically acceptable magnet strength.

It is possible without departing from the scope of this invention to use a mixture of the epoxy resin modified with polyhydric phenol and another resin having a high film-forming power, high adhesive strength and high mechanical strength as the binder, or for coating the magnetic powder, or the molded body.

Compression, injection, extrusion, or calender molding can, for example, be used for making a molded body from a mixture of the magnetic powder and the binder.

The ordinary resin which may be used for the purpose of this invention in addition to the specific resin having a rustproofing action is selected from among common thermoplastic or thermosetting resins, or rubbers, depending on the molding and film-forming methods which will be employed. Specific examples of the thermosetting resins which can be used include phenolic, epoxy, and melamine resins. Examples of the thermoplastic resins include polyamides such as nylon 6 and nylon 12, polyolefins such as polyethylene and polypropylene, polyvinyl chloride, polyesters, and polyphenylene sulfide. It is also possible to use with those resins any ordinary additives including a plasticizer, a lubricant, a heat stabilizer, a flame retardant, and any other modifier.

The following is probably a proper explanation of the reason for the rustproofing action which is exhibited by a high molecular compound produced by reacting with an epoxy resin a polyhydric phenol compound (or a polyhydric phenol) containing a group of atoms having a power of forming a coordinate bond and a reducing action, like a polytannin resin.

When an epoxy resin modified with a polyhydric phenol (sometimes referred to simply as a "modified epoxy resin"), which contains a group of atoms having a power of forming a coordinate bond and a reducing action, is used as a binder for a bonded magnet, the hydroxyl groups which it contains react with oxide or oxyhydroxide existing on the surface of the rare earth magnetic material and form a water-insoluble complex compound which covers the surfaces of the magnetic particles and isolates them from any oxygen and water penetrating the binder resin. When a polyhydric phenol compound containing at least two adjacent hydroxyl groups is employed, at least two oxygen atoms are available for bonding the compound to the surface of the magnetic material apparently more strongly than any compound not containing adjacent hydroxyl groups is bonded to it.

It is also considered that by virtue of its high reduction action, the polyhydric phenol compound can reduce to stable black rust, $Fe_3O_4$, a part of FeOOH of which, for example, the red rust of iron consists mainly, and thereby inhibit the spreading of rust.

It is also possible that, insofar as a polyhydric phenol compound acts as a radical scavenger, and as an oxygen molecule is a kind of radical (or triplet radical), the polyhydric phenol remaining without forming any complex compound as hereinabove mentioned may scavenge any oxygen molecule invading the magnet of this invention before it reaches the magnetic particles. This mechanism delays the oxidation of the magnetic particles and thereby prolongs the life of the bonded magnet according to this invention. The polyhydric phenol compound can be considered to exhibit such an action, whether it may be used for coating the magnetic powder, as the binder, or for coating the molded body.

Moreover, as the compound has a very high molecular weight, it can bond the magnetic powder so strongly as to overcome the problem of brittleness which is encountered when a polytannin resin is used, and can thereby make a bonded magnet having a satisfactorily high strength for practical use.

Description will now be made of the case in which (b) a redox resin, or (c) a high molecular compound produced by curing a mixture of ascorbic acid, or a derivative thereof, and an epoxy resin is used as the resin containing a group of atoms having a power of forming a coordinate bond (or chelate) and a reducing action.

(b) A redox resin as a reduction agent:

Examples of the reducing redox resins are polyvinyl polyhydric phenol (where the polyhydric phenol is a compound having a plurality of hydroxyl groups bonded to the benzene ring, such as hydroquinone, catechol, or pyrogallol), a polyhydric phenol-formaldehyde resin, and a polyvinyl thiokol resin.

(c) A high molecular compound produced by curing a mixture of ascorbic acid, or a derivative thereof, and an epoxy resin:

There is no particular limitation to the epoxy resin which can be used. It is possible to use any known epoxy resin formed from, for example, bisphenol, phenol, ester, or N-glycidylamine. The mixing ratio of the epoxy resin and ascorbic acid or a derivative thereof depends on the epoxy equivalent of the resin and the number of the hydroxyl (—OH) groups which the acid or its derivative contains.

The following is believed to be a proper explanation of the mechanism which causes the redox resin as a reduction agent (b) or the high molecular compound (c) to exhibit a rustproofing action.

The hydroxyl group which the redox resin as a reduction agent contains can form a coordinate bond with a metal ion, and is, therefore, considered to react with a metal oxide or oxyhydroxide (e.g. FeOOH) on the surfaces of the magnetic particles and form a complex (or chelate) compound which is chemically adsorbed to the particle surfaces, whereby the resin is strongly bonded to the magnetic particles. The redox resin as a reduction agent is also considered to inhibit by its reducing nature the oxidation of the magnetic material (i.e. its chemical reaction forming rust). Moreover, as the redox resin as a reduction agent has also a radical scavenging action, and as the oxygen molecule is a kind of radical (or triplet radical), it is considere that the residual hydroxyl or SH group (which remains without forming any complex compound) scavenges any invading oxygen molecule before it reaches the magnetic particles.

Ascorbic acid has a hydroxyl group capable of forming a complex compound with a metal ion and is reducing, as any reducing redox resin does and is. Therefore, it is assumed that the binder for a bonded magnet which is prepared from a mixture of ascorbic acid and an epoxy resin has the same rustproofing action as that of the redox resin which has hereinabove been described.

DETAILED DESCRIPTION OF THE INVENTION

This invention consists essentially in the use of a specific resin for one or more of the purposes of coating the particles of a magnetic powder, bonding them to make a molded body, and coating the surface of the molded body. The specific resin contains a group of atoms having a power of forming a coordinate bond and a reducing action, like a polytannin resin, and is also useful as a binder for making a bonded magnet which is sufficiently strong for practical use.

According to the first to fourth aspects of the invention, the specific resin is a high molecular compound produced by reacting a polyhydric phenol compound and an epoxy resin. According to the fifth aspect thereof, the specific resin is a redox resin as a reduction agent. According to the sixth aspect thereof, the specific resin is a high molecular compound produced from a mixture of ascorbic acid or a derivative thereof, and an epoxy resin. Each aspect of the invention will now be described in further detail.

THE FIRST TO FOURTH ASPECTS OF THE INVENTION

According to the first to fourth aspects of this invention, a high molecular compound which is produced by reacting an epoxy resin with a polyhydric phenol compound or compounds is used for one or more of the purposes of coating the particles of a magnetic powder, bonding them to make a molded body, and coating the surface of the molded body. The polyhydric phenol compound or compounds are selected from among a polyhydric phenol having adjacent hydroxyl groups, polyhydric phenolic carboxylic acid having adjacent hydroxyl groups, an ester of a polyhydric phenol and a polyhydric alcohol having adjacent hydroxyl groups, and a polycyclic and polyhydric phenol having adjacent hydroxyl groups, and are similar to a polytannin resin, insofar as they contain groups having a power of forming a coordinate bond and a reducing action.

The following are specific examples of the polyhydric phenols and compounds which can be employed:

(1) Polyhydric Phenols: Catechol, pyrogallol, and hydroxyhydroquinone;

(2) Polyhydric Phenolic Carboxylic Acids: Gallic acid, catechol-3- carboxylic acid, catechol-4-carboxylic acid, m-digallic acid, pyrogallol-4-carboxylic acid, pyrogallol-4.6-dicarboxylic acid, and tannic acid;

(3) Esters of Polyhydric Phenols and Polyhydric Alcohols: Esters formed from any combination of the polyhydric phenolic carboxylic acids as listed at (2) above, and the alcohols as listed below: Ethylene glycol, propylene glycol, butylene glycol, 1.6-hexanediol, glycerol, trimethylolpropane, pentaerythritol, sorbitol, and glucose;

(4) Polycyclic and Polyhydric Phenols: Products formed by condensation reactions from aldehydes and compounds as listed below: Catechol, catechol-3 (or 4)-carboxylic acid (or an ester thereof), pyrogallol, hydroxyhydroquinone, pyrogallol-4-carboxylic acid (or an ester thereof), pyrogallol-4.6-dicarboxylic acid (or an ester thereof), 3.4.5-trioxybenzoic acid (or an ester thereof), tannic acid (or an ester thereof), and urushiol.

Specific examples of the polyhydric phenol compounds as mentioned at (4) above include the condensation products of pyrogallol or hydroxyhydroquinone, and aromatic aldehydes, as disclosed in Japanese Patent Application Laid-Open No. 54317/1980, and the condensation products of pyrogallol and aldehydes (formaldehyde, decylaldehyde, benzaldehyde, etc.), as disclosed in Japanese Patent Application Laid-Open No. 130642/1978.

There is no particular limitation to the epoxy resin which can be used for the purpose of this invention. It is possible to use any known epoxy resin formed from bisphenol, phenol, ester, N-glycidylamine, or the like. The mixing ratio of the epoxy resin and the polyhydric phenol compound (or compounds) depends on the epoxy equivalent of the resin and the number of hydroxyl groups which the polyhydric phenol compound contains.

A magnetic powder containing at least 50 atom % of iron is used for the purpose of this invention. More specifically, it is, for example, a powder of an alloy which is generally called a Nd-Fe-B alloy, such as $Nd_2Fe_{14}B$, or another alloy further containing another element (e.g., another rare earth element such as Pr or Dy, another 3d transition element such as Co or V, or Al, Ga, or Nb), a powder of a compound obtained by adding another element or elements (e.g., Al, Si, Ti, Co, V, Cr and Mo) to $SmFe_{12}$ having a crystal structure of the $ThMn_{12}$ type, or a powder of $Fe_{16}N_2$ consisting of needle crystals providing anisotropy. The powder of a Nd-Fe-B alloy is, among others, preferred from a practical standpoint, as it exhibits higher magnetic properties than any other presently known magnetic material does.

The bonded magnet of this invention preferably contains 70% to 95% by volume of magnetic powder. A magnet containing less than 70% by volume of magnetic powder has too low magnetic properties to be useful for a wide range of purposes. A magnet containing over 95% by volume of magnetic powder contains too small a proportion of binder, and is, therefore, too brittle to withstand practical use.

The invention will now be described more specifically with reference to examples. Although all of these examples are directed to bonded Nd-Fe-B alloy magnets which theoretically contain 80% by volume of magnetic powder, it is to be understood that they are merely illustrative of this invention, and are not intended for limiting the scope of this invention.

EXAMPLE 1

A high molecular compound produced by reacting tannic acid and an epoxy resin was used as a binder.

A methanol solution containing 1.00 g of tannic acid, $C_6H_2(OH)_3$-CO-O-$C_6H_2(OH)_2COOH$, which is a polyhydric phenolic carboxylic acid having a molecular weight of 306, was mixed with a methyl-ethyl-ketone (MEK) solution containing 9.53 g of "Epikote 1007", which is a solid epoxy resin of Yuka-Shell Company having a molecular weight of about 2900 and an epoxy equivalent of 1600 to 1900, and produced by using bisphenol. 267 g of a NdFeB powder prepared by ultrarapid quenching (General Motors' product, MQ-B) was put in the mixed solution, and was mixed with it carefully. Substantially all of the solvents were removed by vaporization to yield a substantially dry compound. The compound was put in a mold, and press molded at a pressure of 6 t/cm$^2$ to form a green molded body. The molded body was cured in an oven having a temperature of 160° C. for three hours to yield a bonded magnet approximately measuring 10 mm in diameter by 10 mm long, and still remaining unmagnetized.

Ten magnets were prepared. They were put in an environmental tester having a temperature of 60° C. and a humidity of 90%. After every 100 hours, they were taken out of the tester and the surface of each sample was examined with the naked eye and through an optical microscope having a magnification of 30. The samples were put back in the tester immediately after examination. This test was continued until the samples had been left to stand in the tester for a total period of 500 hours.

EXAMPLE 2

A high molecular compound produced by reacting gallic acid and an epoxy resin was used as a binder.

A methanol solution containing 1.00 g of gallic acid, $C_6H_2(OH)_3COOH$, which is a polyhydric phenolic carboxylic acid having a molecular weight of 170, was mixed with a MEK solution containing 8.53 g of "Epikote 1007" under stirring, and 248 g of MQ-B was put in the mixed solution, and mixed with it carefully. Thereafter, EXAMPLE 1 was repeated for preparing magnets each mersuring 10 mm in diameter by mm long, and conducting 500 hours of an environmental test.

EXAMPLE 3

A high molecular compound produced by reacting a polycyclic and polyhydric phenol and an epoxy resin was used as a binder.

A compound having the structural formula shown below, which is a polycyclic and polyhydric phenol having a molecular weight of 340, was synthesized by the process of Example 4 in Japanese Patent Application Laid-Open No. 130642/1978:

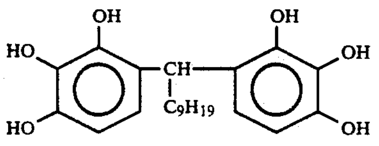

An acetone solution containing 1.00 g of the above compound was mixed with a MEK solution containing 8.50 g of "Epikote 1007", and 240 g of MQ-B was put in the mixed solution, and mixed with it carefully. Thereafter, EXAMPLE 1 was repeated for preparing magnets each measuring 10 mm in diameter by 10 mm long, and conducting 500 hours of an environmental test.

EXAMPLE 4

A high molecular compound produced by reacting a polycyclic and polyhydric phenol and an epoxy resin was used as a binder.

A compound having the structural formula shown below, which is a polycyclic and polyhydric phenol having a molecular weight of 340, was synthesized by the process of Example 1 in Japanese Patent Application Laid-Open No. 54317/1980:

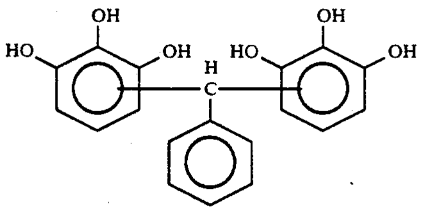

An acetone solution containing 1.00 g of the above compound was mixed with a MEK solution containing 8.50 g of "Epikote 1007", and 240 g of MQ-B was put in the mixed solution, and mixed with it carefully. Thereafter, EXAMPLE 1 was repeated for preparing magnets each measuring 10 mm in diameter by 10 mm long, and conducting 500 hours of an environmental test.

COMPARATIVE EXAMPLE 1

An ordinary resin was used as a binder.

A methanol and toluene solution containing 0.50 g of dicyandiamide, which is a common curing agent, was mixed with a MEK solution containing 9.50 g of "Epikote 1007", and 253 g of MQ-B was put in the mixed solution, and mixed uniformly with it. Thereafter, EXAMPLE 1 was repeated for preparing magnets each measuring 10 mm in diameter by 10 mm long, and conducting 500 hours of an environmental test.

COMPARATIVE EXAMPLE 2

An ordinary resin was used as a binder for making molded bodies, and their surfaces were coated with a polytannin resin.

COMPARATIVE EXAMPLE 1 was repeated for molding magnets. They were dipped in a MEK solution containing 15% by weight of a polytannin resin. Then, the solvent was removed by vaporization, and the resin was cured by heating at 150° C. for 15 minutes, whereby the surface of each magnet was coated with a film of the polytannin resin. The magnets were dipped in a 1N solution of sulfuric acid, and left to stand for a period of about 30 seconds, but only a trace of hydrogen gas was produced. Thus, it was confirmed that the film with which each magnet had been coated was substantially free of any pinhole defect. Thereafter, EXAMPLE 1 was repeated for conducting 500 hours of an environmental test to see if any rust would form on the magnets.

TABLE 1 shows the results of the tests which were obtained in EXAMPLES 1 to 4 and COMPARATIVE EXAMPLES 1 and 2. Each symbol has the meaning as defined below.

TABLE 1

| | Results of the environmental tests at 60° C. and 90% humidity. | | | | |
|---|---|---|---|---|---|
| | Test period (hours) | | | | |
| Samples | 100 | 200 | 300 | 400 | 500 |
| EXAMPLE 1 | ⊚ | ⊚ | ⊚ | ○ | Δ |
| EXAMPLE 2 | ⊚ | ⊚ | ⊚ | ○ | Δ |
| EXAMPLE 3 | ⊚ | ⊚ | ⊚ | ○ | Δ |
| EXAMPLE 4 | ⊚ | ⊚ | ⊚ | ○ | Δ |
| COMPARATIVE EXAMPLE 1 | ○ | Δ | X | XX | XX |
| COMPARATIVE EXAMPLE 2 | ⊚ | ⊚ | ⊚ | ⊚ | ⊚ |

⊚: No rusting was found to have occured;
○: Spots of rust were detected;
Δ: A medium degree of rusting was found to have occurred;
X: Heavy rusting;
XX: Very heavy rusting (rust was found to cover the whole surface of the sample, and was clearly visible to the naked eye).

As is obvious from TABLE 1, no rusting occurred for a total of 300 hours to any of the bonded magnets according to EXAMPLES 1 to 4 that had been made by using a modified epoxy resin as the binder, and it was only when they were examined after a total of 400 hours that some spots of rust were detected on the magnets. These results confirm the excellent rustproofness of the magnets according to this invention. The magnets of this invention were by far superior in oxidation resistance to the conventional magnets according to COMPARATIVE EXAMPLE 1 which had been made by using an ordinary resin as the binder, though they were inferior to the products of COMPARATIVE EXAMPLE 2 having a surface coated with a polytannin resin. It is, therefore, obvious that the magnet of this invention made by using a modified epoxy resin as the binder is very effective for use in any of a wide variety of usual cases in which no extremely high level of rustproofness is required of the magnet. Moreover, the use of a rustproofing resin as the binder enables a reduction in the cost of manufacturing the magnet of this invention, since the molded body does not call for any rustproofing surface treatment such as coating with a rust inhibitive agent.

EXAMPLE 5

A modified epoxy resin was used as a binder to form molded bodies, and their surfaces were coated with a polytannin resin.

EXAMPLES 1 to 4 were repeated for making bonded magnets and COMPARATIVE EXAMPLE 2 was repeated for coating each magnet with a polytannin resin. These magnets will hereinafter be referred to as Samples 5-1, 5-2, 5-3 and 5-4, respectively. Samples 5-1 mean the magnets which were made by repeating EXAMPLE 1, and coated with the polytannin resin, and so on. COMPARATIVE EXAMPLE 2 was also repeated for making samples coated with the polytannin resin. All of these samples were left to stand in a severer environment having a temperature of 60° C. and a humidity of 95% for a total of 600 hours. The results of this environmental test are shown in TABLE 2, in which each symbol means what the corresponding symbol in TABLE 1 does, as defined above.

TABLE 2

| | Results of the environmental test at 60° C. and 95% humidity. | | | | |
|---|---|---|---|---|---|
| | Test period (hours) | | | | |
| Samples | 100 | 200 | 400 | 500 | 600 |
| 5-1 | ◎ | ◎ | ◎ | ◎ | ○ |
| 5-2 | ◎ | ◎ | ◎ | ◎ | ○ |
| 5-3 | ◎ | ◎ | ◎ | ◎ | ○ |
| 5-4 | ◎ | ◎ | ◎ | ◎ | ○ |
| COMPARATIVE EXAMPLE 2 | ◎ | ◎ | ○ | Δ | X |

As is obvious from TABLE 2, all of Samples 5-1 to 5-4 of this invention could withstand exposure to the corrosive environment without getting rusted for a total period of 500 hours, while rust was detected on the samples of COMPARATIVE EXAMPLE 2 when they were examined after a total of 400 hours. These results confirm that the bonded magnet of this invention made by using a modified epoxy resin as the binder, and having its surface coated with a polytannin resin can stand use even in a very severe or corrosive environment, and exhibit a high level of rustproofness which has been difficult to achieve by any conventional bonded magnet. It is, however, to be noted that it is not always necessary to use a polytannin resin for coating the magnet of this invention, but that it is, of course, possible to use for the same purpose any other resin employed usually as a rust inhibitive agent, and also any modified epoxy resin as herein disclosed.

EXAMPLE 6

Comparison was made in mechanical strength between magnets made by using a modified epoxy resin as a binder and magnets made by using a polytannin resin as a binder.

Cylindrical magnets each having a large bore diameter, i.e. having an outside diameter of 32 mm, an inside diameter of 30 mm and a length of 10 mm, were press molded from the same mixtures of materials as those employed in EXAMPLES 1 to 4, respectively. An identically sized and shaped magnet containing 80% by volume of MQ-B (magnetic powder) as a calculated value was also made by using a polytannin resin as a binder. These magnets were compared in strength. The comparison was made by allowing each magnet to drop onto a concrete floor from a height of 50 cm so that its cylindrical peripheral surface might strike against the floor surface. The magnet containing the polytannin resin as the binder broke into several pieces, but no breakage occurred to any of the magnets which had been made by following EXAMPLES 1 to 4. Moreover, none of the magnets according to this invention had broken during any part of its manufacturing process including the steps of press molding and curing, while cracking and chipping had often occurred to the comparative magnet during the manufacture thereof. These results confirm that the magnet of this invention has a sufficiently high mechanical strength for practical use which is higher than that of any bonded magnet made by using a polytannin resin as the binder.

Thus, the bonded magnet of this invention has not only a high level of rustproofness, but also a high level of strength, and can, therefore, be used for a variety of purposes for which no conventional bonded magnet has been suitable. The application of a rust inhibitive agent to the surface of the molded body imparts to the bonded magnet of this invention a still higher level of rustproofness which enables it to withstand a long time of use even in a very severe or corrosive environment.

COMPARATIVE 3 AND EXAMPLES 7 TO 13

A modified epoxy resin was used for one or more of the purposes of coating a magnetic powder, bonding it, and coating a molded body.

A comparative sample (COMPARATIVE EXAMPLE 3) and seven samples of this invention (EXAMPLES 7 to 13) were prepared by using the materials shown in TABLE 3 below. In TABLE 3, "none" means that no such film was formed, and "modified epoxy" means the mixture of a methanol solution of tannic acid, $C_6H_2(OH)_3$—CO—O—$C_6H_2(OH)_2COOH$, which is a polyhydric phenolic carboxylic acid having a molecular weight of 306, and a MEK solution of "Epikote 1007", which is a solid bisphenol type epoxy resin produced by Yuka-Shell Company, and having a molecular weight of about 2900 and an epoxy equivalent of 1600 to 1900. The mixture was obtained by employing tannic acid and the epoxy resin in a weight ratio of 1 to 9.53. "Phenol" means a resol type phenolic resin.

The following is a description of the methods which were employed for "forming a resin film on the surfaces of magnetic particles", "mixing the magnetic powder and a binder resin, and molding their mixture", and "forming a resin film on the surface of a molded body":

Forming a resin film on the surfaces of magnetic particles:

The magnetic powder was dipped in the above mixture of the solutions, was allowed to dry to the touch, and was heated at 180° C. for an hour in a nitrogen atmosphere.

Mixing the magnetic powder and a binder resin, and molding their mixture:

The powder and the resin were mixed to form a mixture consisting of 80% by volume of powder and 20% by volume of resin, and the mixture was molded under a pressure of 6 tons/cm$^2$ at ordinary temperature. Then, the binder resin was cured in a nitrogen atmosphere by heating at 180° C. for an hour if it was the above mixture of the solutions, or by heating at 190° C. for two hours if it was the phenolic resin, whereby each molded body measuring approximately 10 mm in diameter by 10 mm long was obtained.

Forming a resin film on the surface of a molded body:

Each molded body was dipped in the above mixture of the solutions, and was allowed to dry to the touch. Then, the resin covering the molded body was cured by heating at 180° C. for an hour in a nitrogen atmosphere.

TABLE 3

| Sample | Resin film on the magnetic particle surfaces | Binder | Resin film on the molded body surface |
|---|---|---|---|
| COMPARATIVE EXAMPLE 3 | None | Phenol | None |
| EXAMPLE 7 | Modified epoxy | " | " |
| EXAMPLE 8 | " | Modified epoxy | " |
| EXAMPLE 9 | " | Phenol | Modified epoxy |
| EXAMPLE 10 | " | Modified epoxy | " |
| EXAMPLE 11 | None | Modified epoxy | None |
| EXAMPLE 12 | " | Modified epoxy | Modified epoxy |
| EXAMPLE 13 | " | Phenol | " |

The magnet samples which had been made as hereinabove described were tested for rustproofness in an environment having a temperature of 60° C. and a humidity of 95% as hereinabove described. The test results are shown in TABLE 4, in which each symbol means what the corresponding symbol in TABLE 1 means, as defined before.

TABLE 4

| Sample | Results of the environmental tests at 60° C. and 95% humidity. Test period (hour) | | | | | |
|---|---|---|---|---|---|---|
| | 100 | 200 | 300 | 400 | 600 | 800 |
| COMPARATIVE EXAMPLE 3 | Δ | X | XX | XX | XX | XX |
| EXAMPLE 7 | ⊚ | ⊚ | ○ | ○ | Δ | X |
| EXAMPLE 8 | ⊚ | ⊚ | ⊚ | ○ | Δ | X |
| EXAMPLE 9 | ⊚ | ⊚ | ⊚ | ⊚ | ⊚ | ○ |
| EXAMPLE 10 | ⊚ | ⊚ | ⊚ | ⊚ | ⊚ | ⊚ |
| EXAMPLE 11 | ⊚ | ⊚ | ○ | Δ | X | XX |
| EXAMPLE 12 | ⊚ | ⊚ | ⊚ | ⊚ | ○ | Δ |
| EXAMPLE 13 | ⊚ | ⊚ | ⊚ | ⊚ | Δ | X |

The results shown in TABLE 4 confirm that the modified epoxy resin used for coating the magnetic particles, bonding them, or coating the surface of the molded body can improve the rustproofness of the magnet, though to a varying degree, and that its use for two or all of those purposes yields a magnet having a still higher level of rustproofness.

As is obvious from the foregoing description, the use as a binder of a modified epoxy resin, or a mixture thereof with another ordinary resin, enables the realization of a bonded magnet having a very high level of rustproofness which eliminates the necessity for the use of any additional rust inhibitive agent, and the magnet of this invention can, therefore, be manufactured at a lower cost by a simpler process. Moreover, it can be molded with a complicated shape or a small wall thickness and yet is so strong that its handling does not call for any special precaution.

Moreover, it is possible to coat the particles of a magnetic powder and/or the surface of a molded body with a rustproofing compound to make a bonded magnet intended for use in a particularly severe or corrosive environment. This magnet has a by far higher level of rustproofness than that of any product coated with a polytannin resin.

Thus, the bonded magnet of this invention is substantially free from the problem of rusting which has been unavoidable by any known bonded magnet formed from a magnetic powder consisting mainly of iron. It has both a very high level of oxidation and corrosion resistance and a sufficiently high level of strength for practical use.

THE FIFTH AND SIXTH ASPECTS OF THE INVENTION

The fifth and sixth aspects of this invention will now be described more specifically with reference to a few examples. According to the fifth aspect of this invention, a redox resin as a reduction agent is used as the binder, and according to the sixth aspect thereof, the binder is a high molecular compound produced by curing a mixture of ascorbic acid or a derivative thereof, and an epoxy resin.

EXAMPLE 14

A redox resin as a reduction agent was used as the binder for molding a bonded magnet. 277 g of MQ-B (the tradename of General Motors for a Nd-Fe-B alloy powder produced by ultrarapid quenching) was put in a MEK (methyl ethyl ketone) solution containing 10 g of polyvinylhydroquinone resin having the structural formula shown below, and was thoroughly mixed with it:

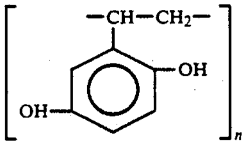

where n is an integer.

Substantially all of the solvent was removed by vaporization, whereby a substantially dry compound was obtained. It was put in a mold, and press molded at a pressure of 6 tons/cm$^2$ to form a green molded body. The molded body was cured by heating in an oven having a temperature of 160° C. for three hours to yield a bonded magnet measuring approximately 10 mm in diameter by 10 mm long, and still remaining unmagnetized. The magnet was put in an environmental tester having a temperature of 60° C. and a humidity of 90%. After every 100 hours, it was taken out and its surface was examined with the naked eye and through an optical microscope having a magnification of 30. The sample was put back in the tester immediately after examination. This test was continued for a total of 500 hours.

EXAMPLE 15

A high molecular compound produced by mixing ascorbic acid and an epoxy resin was used as the binder for molding a bonded magnet.

A methanol solution containing 0.50 g of L-ascorbic acid (vitamin C) was mixed with a MEK solution containing 8.25 g of "Epikote 1007" (the tradename of Yuka-Shell Co. for a solid epoxy resin having a molecular weight of about 2900). 222 g of MQ-B was put in the mixed solution, and mixed uniformly with it. Thereafter, EXAMPLE 14 was followed for making a bonded magnet measuring 10 mm in diameter by 10 mm long, and conducting 500 hours of an environmental test, except that the molded body was cured in an argon gas atmosphere. The argon gas, which is an inert gas, was used for preventing the decomposition by oxidation of any unreacted ascorbic acid.

COMPARATIVE EXAMPLES 1 and 2 were repeated for preparing comparative samples.

TABLE 5 shows the results of the tests which were conducted on the products of EXAMPLES 14 and 15, and COMPARATIVE EXAMPLES 1 and 2. Each symbol means what the corresponding symbol in TABLE 1 has hereinbefore been defined as meaning.

TABLE 5

| | Results of the environmental tests at 60° C. and 90% humidity | | | | |
|---|---|---|---|---|---|
| | Test period (hours) | | | | |
| Sample | 100 | 200 | 300 | 400 | 500 |
| EXAMPLE 14 | ◎ | ◎ | ◎ | ◎ | ○ |
| EXAMPLE 15 | ◎ | ◎ | ◎ | ○ | Δ |
| COMPARATIVE EXAMPLE 1 | ○ | Δ | X | X | X |
| COMPARATIVE EXAMPLE 2 | ◎ | ◎ | ◎ | ◎ | ◎ |

EXAMPLE 16

A redox resin as a reduction agent, or a high molecular compound produced by mixing ascorbic acid and an epoxy resin was used as the binder for molding a bonded magnet, and its surface was coated with a polytannin resin.

EXAMPLES 14 and 15 were repeated for making magnets, and COMPARATIVE EXAMPLE 2 for coating their surfaces. These magnets will be referred to as Samples 16-14 and 16-15. Sample 16-14, for example, means that EXAMPLE 14 was repeated for making the magnet. COMPARATIVE EXAMPLE 2 was also repeated for making a comparative sample. These samples were left to stand in a severer environment having a temperature of 80° C. and a humidity of 95% for a total of 800 hours. The results are shown in TABLE 6.

TABLE 6

| | Results of the environmental tests at 80° C. and 95% humidity | | | | |
|---|---|---|---|---|---|
| | Test period (hours) | | | | |
| Sample | 100 | 200 | 400 | 600 | 800 |
| 16-14 | ◎ | ◎ | ◎ | ◎ | ◎ |
| 16-15 | ◎ | ◎ | ◎ | ◎ | ○ |
| COMPARATIVE EXAMPLE 2 | ◎ | ◎ | ◎ | ○ | X |

EXAMPLE 17

Comparison was made in mechanical strength between magnets embodying this invention and a magnet made by using a polytannin resin as the binder.

Cylindrical magnets each having a large bore diameter, i.e. having an outside diameter of 32 mm, an inside diameter of 30 mm and a length of 10 mm were made by press molding from the same mixtures of materials as those employed in EXAMPLES 14 and 15, respectively. An identically sized and shape magnet containing 80% by volume of MQ-B as a calculated value was likewise made by using a polytannin resin as the binder. They were compared in mechanical strength. The comparison was made by allowing each magnet to drop onto a concrete floor from a height of 50 cm so that its cylindrical peripheral surface might strike against the floor surface. The magnet containing the polytannin resin as the binder broke in several pieces, but no breakage occurred to any of the magnets embodying this invention. Moreover, none of the magnets embodying this invention had broken during any part of their manufacturing process including the steps of molding and curing, while cracking or chipping had often occurred to the comparative magnet.

As is obvious from the foregoing, the magnets according to the fifth and sixth aspects of this invention are by far superior in corrosion resistance to the magnet made by using an ordinary resin as the binder, though they are inferior to the magnet having its whole surface coated with a polytannin resin (COMPARATIVE EXAMPLE 2). Therefore, those magnets according to this invention are quite satisfactory for use in a variety of common cases in which no extremely high level of rustproofness will be required. Moreover, the magnet of this invention does not necessarily need to be coated with a rust inhibitive agent, and can, therefore, be manufactured at a very low cost. It is, however, possible to use a rust inhibitive agent to make a magnet having a higher level of rustproofness if it is intended for use in a more corrosive environment. The magnets according to the fifth and sixth aspects of this invention are also so strong that no cracking or chipping occurs during their manufacture, or their use.

What is claimed is:

1. A bonded rare earth magnet composed mainly of a powder of a magnetic material containing at least 50 atom % of a iron, and a high molecular compound produced by reacting with an epoxy resin one or more of a polyhydric phenol having adjacent hydroxyls, a polyhydric phenolic carboxylic acid having adjacent hydroxyls, an ester of a polyhydric phenol and a polyhydric alcohol having adjacent hydroxyls, and a polycyclic and polyhydric phenol having adjacent hydroxyls, or composed mainly of said powder, said compound and a resin.

2. A magnet as set forth in claim 1, wherein said powder is of $Nd_2Fe_{14}B$, an alloy of $SmFe_{12}$ or an alloy of $Fe_{16}N_2$.

3. A bonded rare earth magnet made by molding a powder of a magnetic material containing at least 50 atoms % of iron with a binder of a redox resin as a reduction agent.

4. A bonded rare earth magnet made by molding a powder of a magnetic material containing at least 50 atom % of iron with a binder of a high molecular compound produced by curing a mixture of ascorbic acid, or a derivative thereof, and an epoxy resin.

5. A magnet as set forth in claim 3 or 4, wherein said powder is of $Nd_2Fe_{14}B$, an alloy of $SmFe_{12}$ or an alloy of $Fe_{16}N_2$.

6. A magnet as set forth in claim 2, wherein said alloy is of $Nd_2Fe_{14}B$ containing another element, said element is selected from the group consisting of rare earth elements, Co, V, Al, Ga and V.

7. A magnet as set forth in claim 1, wherein said powder is of a compound obtained by adding at least one element selected from the group consisting of Al, Si, Ti, Co, V, Cr and Mo, to $SmFe_{12}$ having the $ThMn_{12}$ crystal structure.

8. A magnet as set forth in claim 1, wherein said powder is of $Fe_{16}N_2$ consisting of needle crystals providing anisotropy.

9. A magnet as set forth in claim 5, wherein said alloy is of $Nd_2Fe_{14}B$ containing another element, said element is selected from the group consisting of rare earth elements, Co, V, Al, Ga and N.

10. A magnet as set forth in claim 3 or 4, wherein said powder is of a compound obtained by adding at least one element selected from the group consisting of Al, Si, Ti, Co, V, Cr and Mo, to $SmFe_{12}$ having the $ThMn_{12}$ crystal structure.

11. A magnet as set forth in claim 3 or 4, wherein said powder is of $Fe_{16}N_2$ consisting of needle crystals providing anisotropy.

* * * * *